Sept. 2, 1930. L. OTTINGER Re. 17,787

BUSHING

Original Filed March 3, 1924

INVENTOR
Leon Ottinger,
BY C. P. Goepel
ATTORNEY

Reissued Sept. 2, 1930 Re. 17,787

UNITED STATES PATENT OFFICE

LEON OTTINGER, OF NEW YORK, N. Y.

BUSHING

Original No. 1,641,988, dated September 13, 1927, Serial No. 696,426, filed March 3, 1924. Application for reissue filed April 5, 1929. Serial No. 352,873.

This invention relates to bushings.

The object of this invention is to provide a bushing having a resilient bearing portion adapted to support a shaft or the like out of contact with the bushing and a portion arranged for insertion in and attachment to a bored structure, said portion being the sole means for securing said bushing in operative position.

The said bushing is preferably provided with a head which is of greater diameter than the portion which is adapted to line the bore, and preferably this head is hollow and has confined therein said resilient bearing. Preferably the head portion and attaching portion of said bushing are made integral or one-piece, but not necessarily, and said attaching portion is preferably made to be secured in the bored structure by distorting or expanding it, though not necessarily.

An important feature of my invention is that it has a wide field of usefulness and may be used in combinations where it is impractical or impossible to use other forms of bushings. Thus I have found the within described bushing to be particularly well-suited for mounting on a door and supporting the shaft of a latch mounted on said door.

Another important point about my bushing is that it may be quickly applied and is inexpensive to make, as well as having other advantages which will be pointed out hereinafter.

The said resilient bearing is preferably waterproofed, and should be capable of making a water- and dust-tight fit around a shaft or other element, though in some instances this may not be necessary.

The accompanying drawing discloses a preferred embodiment and several modifications of my bushing, as well as an application thereof.

Figure 1:
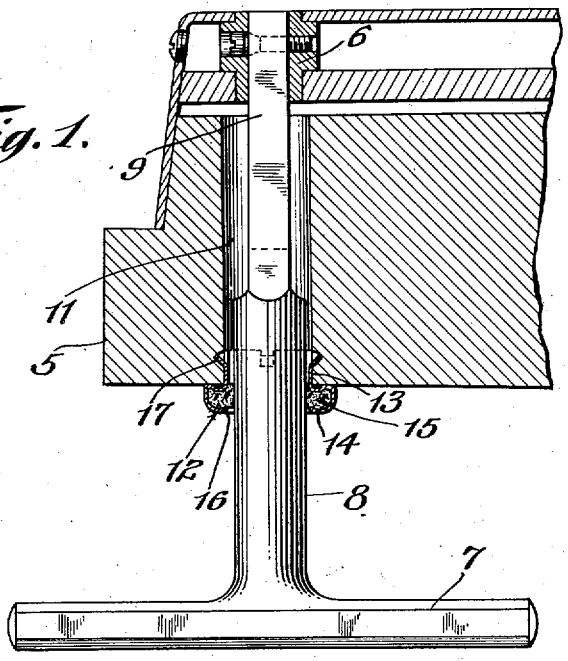
Fig. 1 is a horizontal sectional view through an automobile door and latch showing the application of my bushing to said door and the latch actuating handle.

While in the following description I shall describe my device more particularly with respect to its application and use in connection with latch handles for automobile doors, it will be apparent as this description proceeds that such device likewise may be applied to various analogous uses where a simple and efficient bearing support or bushing for an operating shaft extending through an opening in a door or other structure, is desired. In such cases where the shaft is operatively connected at one side of the structure to a part to be actuated thereby, the opening receiving the shaft is often carelessly drilled, so that when the shaft is positioned therethrough, its axis will not exactly coincide with the axis of said opening, but said shaft will be more or less eccentrically related to the walls of said opening. Heretofore in such instances it has been quite difficult to properly fit and support the shaft in a bearing arranged at the opposite side of the door structure without severe binding or frictional resistance to the turning movement of the shaft, or without providing a bearing support or bushing of relatively complicated and expensive construction.

For purposes of illustration, I have shown my present improvements as applied for use in connection with an automobile door 5 to the inner face of which a suitable latch means having an oscillating rollback 6, is applied. Since this latch constitutes no essential feature of my present improvements, it may be of any desired construction. The rollback 6 is actuated by the usual handle 7 having a cylindrical shaft 8 terminating in a rectangular shank portion 9, the end of which is fitted into the bore of the rollback 6 and rigidly fixed therein. The means for fastening or securing the handle shank to the rollback likewise constitutes no essential part of the present improvements, and such fastening means may consist of any one of the devices shown and described in my Patent No. 1,484,406, issued February 19, 1924, or my Patent No. 1,503,281, issued July 29, 1924.

As clearly shown in Figure 1 of the drawing, the inner and outer faces of the door structure 5 do not extend in parallel relation, but converge towards the free edge of the door. Therefore, if the handle receiving opening 11 extending through said door structure is bored through the door with its outer end in concentric relation to the axis of the rollback 6, the end of said opening at the other side of the door will be eccentric with respect to the rollback. Therefore, when the handle shaft 9 is fitted through said opening and connected to the rollback 6, the axis of said shaft will not exactly coincide with the axis of the opening 11 through the door. Accordingly, if a rigid metal bushing were fitted into the outer end of the opening 11, it would not have uniform bearing contact upon the periphery of the handle shaft and unless said bushing is especially formed in accordance with the degree of eccentricity of the shaft with relation to the opening 11, it would not be possible to properly fit the shaft in said bushing without severe frictional binding engagement tending to retard the free rotation of the handle shaft.

Figure 2:
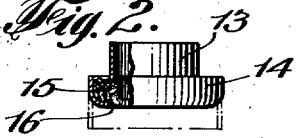
Fig. 2 is a detail view of my bushing, partly in section.

In my Patent No. 1,540,495, issued June 2, 1925, I have shown, described and claimed a combination escutcheon and shaft bearing member, wherein the metal escutcheon is provided with means having direct bearing contact upon the shaft and in which a part of said member is expanded under pressure into the structure of the door whereby the member is fixed permanently in position. In the present case, I likewise provide a sheet metal escutcheon member or bushing 12. This member in one embodiment consists of a one piece metal sleeve or tube having a portion 13 adapted to project into the outer end of the handle opening 11 in the door structure and a diametrically enlarged hollow annular head 14 at one end of the portion 13 of said sleeve. This head is adapted to receive an annular compressible bearing element 15, and as shown in Figure 2 of the drawing, the outer flange or wall of the annular head 14 is turned inwardly and downwardly over and upon the annular element 15 and at its edge has gripping or binding contact therewith, as shown at 16, whereby said annular bearing element is permanently confined within the annular channel of space of the head 14.

Preferably, the annular bearing element 15 is composed of a high grade of felt of suitable texture and is impregnated with an animal oil for the purpose of rendering the same substantially waterproof.

In applying this combination bearing and escutcheon to the door structure, I may use a tool somewhat similar to that shown in my patent last above referred to, whereby tongues or spurs 17 are struck outwardly from the end edge of the part 13 of the bushing which projects into the opening 11 and are firmly embedded in the door structure 5 whereby the bushing is permanently fixed in position upon the door. If desired, the tool may be so formed as to embed these spurs 17 in the door structure at the same time as the flange 16 of the bushing is turned inwardly upon the bearing element 15. It will be noted that in this instance, the element 15 completely fills the annular channel of the head 14 of the bushing, the inner diameter of the annular member 15 being predetermined in accordance with the diameter of the handle shaft 8. Since, however, the structure of the bearing element 15 is inherently yieldable and compressible, it will be apparent that as the shaft is forced through said bearing element and the end of its shank 9 engaged in the bore of the rollback 6, said annular bearing element 15 in the inner portion thereof will automatically accommodate itself to any reasonable eccentric relation which said handle shaft might bear with respect to the head of the bushing or the wall of the opening 11, due to the inaccurate boring of said opening through the door so that when the handle shaft is fixed in connection with the rollback, the axis of said shaft must necessarily be positioned out of alignment with the axis of said opening. In practice, it has been demonstrated that such an automatically compensating bearing support for the handle shaft effectively subserves the purpose in view, and in addition to providing an adequate and firm support for the shaft, while permitting of its free turning or rotating movement in the opening of the door structure, the compressible bearing element of felt or other equivalent material affords a substantially dust and watertight closure between the handle shaft and the opening through the door. Further it will be seen that my invention is adapted to be used in connection with the ordinary type of latch handles now commonly applied upon automobiles and no additions or changes in the structure thereof are necessary. Since it is also manifest that the bushing in which the bearing element is confined may be produced by means of a simple sheet metal stamping operation, the device as a whole will be, therefore, inexpensive.

My new method of application of the combined bearing and bushing to the door structure further reduces cost incident to assemblage of the latch in the door by reason of the fact that all fastening screws or other additional elements for this purpose are eliminated.

It is to be noted that the sole means for retaining the handle shaft in connection with the door structure is the means for fastening the inner end of the shaft in the bore of the rollback. The yieldable bearing member 15 located at the outer face of the door therefore constitutes the sole supporting means for the shaft other than the rollback and as this bearing member is comparatively remote from the rollback, in the event of looseness occurring at the rollback bearings, the member 15 will automatically compensate therefor and tend to resist angular movement of the shaft relative to its axis which would otherwise be caused by vibration transmitted through the door structure. Thus, rattling metallic noise by relative movement between the rollback and the walls of the latch case will be obviated. Preferably, as seen in Fig. 1 of the drawings, the thickness of the yieldable material of which the bearing member 15 is formed, is appreciably less than the diameter of the shaft receiving opening in said member so that notwithstanding the fact that this material is of a high grade of wear resisting felt having its fibers more or less closely united, said bearing member will automatically adapt or accommodate itself to an appreciable degree of eccentricity in the relation between the shaft and the axis of the opening 11 through the door.

Figure 5:
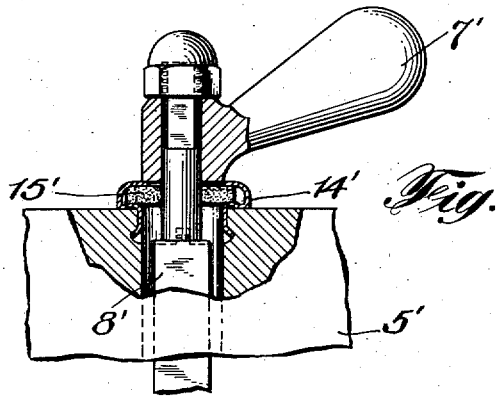
Fig. 5 is a horizontal sectional view of an automobile door showing the application of a modified form of bushing to said door and to a modified latch-actuating handle.
Figure 3:
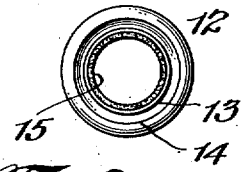
Fig. 3 is a plan view thereof.

In Fig. 5 of the drawing I have shown the device in a slightly modified construction as applied to another type of latch having a vertical operating shaft or spindle 8′. This shaft extends above the upper edge or sill of the door structure 5′ and to the same a suitable handle 7′ is attached. Between this handle and the upper edge of the door my improved bearing and escutcheon member or bushing is disposed. The bushing of sheet metal is substantially identical in its construction to that previously described and is applied to the door structure in the same manner. In this instance, however, the annular member 15′ of compressible material is of somewhat less diameter than the internal diameter of the hollow annular head 14′ of the bushing. Thus said annular bearing member may shift diametrically within said hollow head when the end of the shaft 8′ is inserted therethrough, in accordance with the degree of eccentricity of the shaft end with respect to the opening through the door structure. At the same time, the opposite walls of the hollow annular head of the bushing prevent any axial movement of the bearing element 15′ so that in such lateral shifting of the bearing element the inner portion thereof will be placed under compressing pressure. However, it will be apparent that the same result is obtained in this case as in Figure 1 where the shaft extends transversely through the door, and a combined water and dust-tight closure for the end of the shaft opening and an adequate bearing support for the handle is provided.

Figure 6:
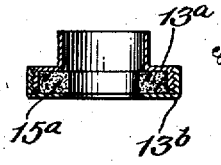
Fig. 6 is still another form of my bushing.
Figure 4:
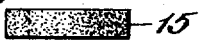
Fig. 4 is a side view of the bearing or washer.

In Figure 6 of the drawing, I have shown another alternative form of the device, wherein the bushing or escutcheon member consists of a body section 13ᵃ in the form of a short metal sleeve or tube having an angular flange at one end providing an annular channel or groove to receive the compressible bearing annulus. The outer wall of the flange 13ᵃ is threaded to receive a flanged cap section 13ᵇ, the radially disposed wall of which has clamping and bearing pressure against the outer side of the bearing annulus 15ᵃ whereby the latter is tightly secured in place. If for any reason this bearing annulus should become loose, the cap member 13ᵇ may be further adjusted so as to increase its pressure upon said annulus.

From the foregoing description considered in connection with the accompanying drawing, it is believed that the construction, manner of use and the several advantages of my present improvements will be fully understood. It will be appreciated that by eliminating the contact of a metal bearing or supporting part with the shaft, wear of the latter is substantially obviated and also any metallic rattling noise due to vibration is wholly overcome. I have found that a high grade of felt of the proper texture and of great durability may be obtained which will be substantially immune to deterioration by the elements, temperature changes or analogous causes, and will practically retain its functional capabilities unimpaired for an indefinite period. I have illustrated and described several different constructions and applications of my invention, but no unnecessary limitations are to be implied therefrom, since it is apparent that the device might also be exemplified in other alternative constructions and applied to many other analogous uses.

Accordingly, I reserve the privilege of resorting to all such legitimate changes in the form, construction and relative arrangement of the several parts as may be fairly embodied within the spirit and scope of the invention as claimed.

I claim:

1. A unitary bushing comprising a hollow head portion and an attaching portion integral therewith adapted to be distorted in securing said bushing in operative position, said attaching portion comprising the sole securing means for said bushing, and a resilient bearing in said head.

2. The combination with an apertured structure and an element passing therethrough, of a unitary metallic bushing comprising opposing flange portions engaging adjacent surfaces of the structure, and a resilient bearing portion combined with said bushing and supporting said element out of contact with said bushing.

3. The combination with an apertured structure and an element passing therethrough, of a unitary bushing comprising a hollow head portion and an integral opposed flange engaging adjacent surfaces of said structure, and adapted to provide the sole means for securing said bushing in operative position and a resilient bearing in said head for supporting said element out of contact with said bushing.

4. The combination with a door, a latch mounted on one side thereof, and a shaft connected to said latch, of a unitary bushing having an integral portion providing the sole means for securing said bushing to the other side of said door, and having a hollow diametrically enlarged head integral with said portion in which is confined a resilient bearing supporting said shaft out of contact with said bushing.

5. The combination with a door, a latch mounted on one side thereof, and a shaft connected to said latch, of a unitary bushing comprising a sleeve distorted to provide the sole means for securing said bushing to the other side of said door, and a hollow head integral with said sleeve having a resilient bearing therein supporting said shaft out of contact with said bushing.

6. In combination with a door structure having a latch handle receiving opening, a latch operating rollback at one end of said opening and an operating handle adapted to be connected to said rollback, an escutcheon member consisting of a sheet metal sleeve fixed in the door structure at the other end of said opening and said sleeve provided with a hollow annular head surrounding the latter end of the opening, and an annular shaft bearing element permanently confined in said hollow head of the escutcheon member and normally having its bearing face in concentric relation with said sleeve, said bearing element yielding under pressure to accommodate itself to an eccentric relation of said shaft with respect to the axis of said opening.

A combined latch shaft bearing and escutcheon comprising a metal sleeve adapted to be inserted into one end of the latch shaft opening through the door and permanently fixed to the latter, the other end of said sleeve having a diametrically enlarged hollow head extending upon the face of the door at the end of said opening and constituting an escutcheon, and a yieldable shaft bearing element of smaller internal diameter than the sleeve permanently confined in said hollow head and automatically accommodating itself to the arrangement of said shaft with its axis disposed in intersecting relation with the axis of the opening through the door without appreciably retarding the free rotation of the handle shaft.

8. In combination with a door structure having an opening therethrough and a latch provided with a rotatable actuating member, an operating shaft for the latch extending through said opening, means for rigidly connecting one end of said shaft to said actuating member constituting the sole means retaining said shaft in assembled relation with the door, and a single bearing member for said shaft mounted upon the door structure in spaced relation to the actuating member and having a bearing surface of less than the diameter of said opening for supporting contact with the shaft intermediate of its ends, said bearing member being composed of a yieldable material adapting itself to an eccentric relation of said shaft with respect to the axis of said opening while supporting said shaft for free rotation in definite projecting relation to the face of the door structure.

9. In combination with a door structure having an opening therethrough and a latch provided with a rotatable actuating member, an operating shaft for the latch extending through said opening, means for rigidly connecting one end of said shaft to said actuating member constituting the sole means retaining said shaft in assembled relation with the door, a supporting element fixed to the door structure at one end of said opening, and an annular bearing member supported by said element against bodily displacement relative thereto, having a bearing surface for the shaft of less than the diameter of said opening, and said surface extending longitudinally on the shaft for a distance appreciably less than the shaft diameter, said bearing member being composed of yieldable material adapting itself to an eccentric relation of said shaft with respect to the axis of said opening while supporting said shaft for free rotation in definite projecting relation to the face of the door structure.

10. The combination with a door, a latch mounted on one side thereof and a shaft connected to said latch, of a unitary bushing comprising opposing flange portions engaging adjacent surfaces of the other side of said door, and a resilient bearing portion supporting said shaft out of contact with said bushing.

11. The combination with a door, a latch mounted on one side thereof and a shaft connected to said latch, of a unitary bushing comprising a hollow head portion and an integral opposed flange engaging adjacent surfaces of said structure, and a resilient bearing in said head supporting said shaft out of contact with said bushing.

12. A unitary bushing having a portion integral therewith adapted to be distorted in securing said bushing in operative position, and a resilient bearing portion combined with said bushing adapted to support a member out of contact with said bushing.

13. A unitary bushing having an opening and an integral portion adapted to be distorted in securing said bushing in operative position, said bushing having a resilient bearing portion provided with an opening the internal diameter of which is less than the internal diameter of the bushing.

14. The combination with an apertured structure and an element passing therethrough, of a unitary bushing having a portion integral therewith adapted to be distorted in securing said bushing to said structure, and having a resilient bearing portion supporting said element out of contact with said bushing.

15. A bushing comprising a hollow head, a sleeve connected thereto adapted to be distorted at a point away from the juncture of said head and sleeve to provide the sole means for securing said bushing in operative position, and a resilient bearing in said head adapted to support a member out of contact with said sleeve and head.

16. A bushing comprising a hollow head, a sleeve integral with a part thereof extend-therefrom at substantially right angles thereto and adapted to be distorted at a point away from the juncture of said head and sleeve to provide the sole means for securing said bushing in operative position, and a resilient bearing in said head adapted to support a member out of contact with said sleeve and head.

17. A bushing having a hollow head, a sleeve extending from said head and adapted to be distorted at a point remote from the juncture of said head and sleeve to provide the sole means for securing said bushing in operative position, and a relatively thin, flat, resilient bearing in said head adapted to support a member out of contact with said sleeve and head.

18. A bushing having a diametrically enlarged hollow head, a sleeve extending from said head and adapted to be distorted at a point away from the juncture of said head and sleeve to provide the sole means for securing said bushing in operative position, and a resilient bearing in said head adapted to support a member out of contact with said sleeve and head.

19. A bushing having a diametrically enlarged hollow head, a sleeve integral with at least a portion of said head adapted to be distorted at a point away from the juncture of said head and sleeve to provide the sole means for securing said bushing in operative position, and a resilient bearing having a major portion thereof confined in said head, and the entire bearing being confined solely to said head region, said bearing being adapted to support a member out of contact with said sleeve and head.

20. A bushing comprising a diametrically enlarged hollow head having an opening, a sleeve integral with at least a portion of said head and adapted to be distorted at a point remote from the juncture of said head and sleeve to provide the sole means for securing said bushing in operative position, and a resilient bearing confined in and solely to said head and having a portion extending into said opening, said bearing having itself an opening substantially concentric with but of less diameter than the openings in said head and sleeve.

21. A bushing having a diametrically enlarged head, a sleeve extending from said head and adapted to be distorted around the edge remote from said head to provide the sole means for securing said bushing in operative position, and a resilient bearing of less thickness than the diameter of said head and confined in and solely to said head, said bearing being arranged to support a member out of contact with said sleeve and head.

22. A bushing having a hollow head, a sleeve extending from said head and adapted to be distorted at the edge remote from said head to provide the sole means for securing said bushing in operative position, and a relatively thin, flat resilient bearing confined in and solely to said head adapted to support a member out of contact with said sleeve and said head.

23. A bushing having a hollow head, a sleeve extending therefrom and adapted to be distorted at the edge remote from said head to provide the sole means for securing said bushing in operative position, and a resilient bearing in said head of less thickness than the depth of said bushing, said bearing being arranged to support a member out of contact with said head and sleeve.

24. A unitary bushing comprising a head portion, a portion integral therewith for insertion in and attachment to a bored structure, and a resilient bearing within said bushing adapted to support a member out of contact with said bushing, said head portion being of greater diameter than the portion which is adapted to line the bore.

25. A unitary bushing comprising a hollow head portion and a sleeve portion integral therewith arranged for insertion in and attachment to a bored structure, and a resilient bearing in said head, said head being of greater diameter than the portion which is adapted to line the bore.

26. The combination with a door, a latch mounted on one side thereof, and a shaft connected to said latch and passing through a bore in said door of a unitary bushing comprising a head portion, a portion integral therewith for insertion in and attachment to said bore, and a resilient bearing within said bushing supporting said shaft out of contact with said bushing, the head of said bushing being of greater diameter than said bore.

In witness whereof I affix my signature.

LEON OTTINGER.